(12) United States Patent
Haddad

(10) Patent No.: US 6,853,444 B2
(45) Date of Patent: Feb. 8, 2005

(54) NON-CONTACT OPTICAL IMAGING SYSTEM FOR BIOMETRIC IDENTIFICATION

(76) Inventor: Waleed S. Haddad, Vision R & D, Inc., Suite A, 2245 S. Vasco Rd., Livermore, CA (US) 94550

( * ) Notice: Subject to any disclaimer, the term of this patent is extended or adjusted under 35 U.S.C. 154(b) by 0 days.

(21) Appl. No.: 10/233,031

(22) Filed: Aug. 30, 2002

(65) Prior Publication Data

US 2004/0041998 A1 Mar. 4, 2004

(51) Int. Cl.[7] .................................................. G06K 9/74
(52) U.S. Cl. ............................ 356/71; 382/124; 382/126
(58) Field of Search .................... 356/71, 121, 601; 382/124, 125, 126, 127

(56) References Cited

U.S. PATENT DOCUMENTS

| | | | | |
|---|---|---|---|---|
| 5,629,764 A | * | 5/1997 | Bahuguna et al. | 356/71 |
| 5,812,252 A | * | 9/1998 | Bowker et al. | 356/71 |
| 5,987,156 A | * | 11/1999 | Ackland et al. | 382/125 |
| 6,240,200 B1 | * | 5/2001 | Wendt et al. | 382/127 |
| 6,292,576 B1 | * | 9/2001 | Brownlee | 382/124 |
| 6,324,297 B1 | * | 11/2001 | Uchida | 382/125 |
| 6,404,904 B1 | * | 6/2002 | Einighammer et al. | 382/124 |
| 6,466,686 B2 | * | 10/2002 | Senior | 382/124 |
| 6,643,390 B1 | * | 11/2003 | Clark et al. | 356/71 |

* cited by examiner

*Primary Examiner*—Gregory J. Toatley, Jr.
*Assistant Examiner*—Juan Valentin, II
(74) *Attorney, Agent, or Firm*—McNichols Randick et al.; Everitt Beers; John Nielsen

(57) ABSTRACT

An optical system for imaging the features, ridges, and height variations of an object by exploiting the properties of specular reflection of light to maximize the contrast of the features, ridges, and height variations. The system provides a non-contact method of imaging objects suitable for biometric identification, such as the imaging of fingerprints. The system obtains the strong specular reflection using a properly shaped wave front. Optionally, the system can include a polarizer that filters and thereby enhances the specular reflection from the surface. Optionally, the system can also include pre-processing means for adjusting image brightness, contrast, and magnification.

48 Claims, 5 Drawing Sheets

NON-CONTACT OPTICAL IMAGING SYSTEM FOR BIOMETRIC IDENTIFICATION

BACKGROUND OF THE INVENTION

A. Field of the Invention

The present invention relates to a non-contact optical imaging system for biometric identification.

B. Description of Related Art

There is a great need in today's age of electronic information for increased security and positive identification. For example, this includes reliable identification of purchasers at vendor sites and over the internet, identification of participants in other financial transactions, and identification in access control and anywhere sensitive information must be handled or transmitted. The growing field of biometrics provides one technological answer to this need for reliable identification. Biometric technologies measure and characterize some unique feature of a person's anatomy, which is then used to identify that person.

A number of biometric identification devices already exist. These include fingerprint readers, hand geometry readers, iris imagers, retinal cameras, voice recognition, and face recognition devices. Devices that are more esoteric include fingernail ridge identification and cameras that image the vascular patterns in the earlobe. Probably the most promising, best developed, and most common of these biometric devices are fingerprint readers.

Each of these biometric identification devices has its own problems and strong points. Important features of any biometric device are user comfort, with resulting willingness to use; low false rejection rate; low false acceptance rate; cost; size; speed of operation; and robustness in a wide range of operating environments. Fingerprint readers represent a good mix of all of these features, especially user acceptance.

There are two basic types of fingerprint readers available today, ones with (1) direct-reading sensors and (2) optical sensors. All direct-reading sensors, and all but a few rare specialized optical readers, require users to press the pad of their finger firmly onto a "platen" to be read. In the case of direct readers, the platen is the surface of the sensor itself. The device essentially makes a contact print of the finger surface, relying on the principle that the higher ridges of the finger will touch, or be closer to the surface, of the sensor than the valleys of the fingerprint. Several variations on this technology are currently available.

On the other hand, the vast majority of existing optical readers have a prism or other glass (or possibly plastic) surface on which users place their fingers, and through which the image of the fingerprint is taken. These devices rely on changes in the reflectivity at the platen surface caused by contact with regions of the finger surface to produce high contrast images of the ridges in the fingerprint. The reflectivity changes are due to the difference and discontinuity in the refractive index at the surface between the platen and air.

When a finger (or any object with a refractive index slightly higher that of air) is placed in intimate contact (including, possibly, by wetting) with the platen surface the reflectivity at that location will be reduced. In principle only the high points (ridges) of the fingerprint will make intimate contact with the platen surface and will therefore appear darker than the valleys. The illumination of the platen surface is designed to maximize this effect.

Contact optical biometric identification devices have inherent problems, including large variations in the print pattern depending on finger moistness or oiliness, variations with finger pressure, poor prints or missing sections of the print with dry or overly wet fingers, loss of contrast due to residue, or latent prints left on the platen from prior use. In addition, there is also the security risk of identity theft due to the possibility of a user lifting any latent prints. Many of the problems with optical readers are also present with direct reading sensors because of the need to place the finger onto the platen. In addition, other problems with the direct-reading sensors include fragility (breaking when an object is dropped on the necessarily thin platen), damage due to electrostatic discharge, and high cost.

SUMMARY OF THE INVENTION

The present invention is a new approach to optical reader technology. For its primary physical contrast mechanism, it relies on specular reflection directly from the object surface, rather than relying on internal reflection. This gives the invention the distinct advantage of non-contact biometric image acquisition, freeing it from most of the problems with current contact optical and direct reader technology. In addition, the invention is uniquely based on low cost and proven optical image sensors and therefore has the market driven advantage in both price and resolution. It also has no susceptibility to electrostatic discharge, works well regardless of the user's finger moistness or dryness, and has no print variation due to finger pressure. In fact, one of its most important advantages is that no pressure is required to get a good print.

The preferred embodiment of the invention requires a user to place a finger over an opening in the housing to take the print, but other embodiments allow an entirely non-contact model for use in sterile or other special environments. A notable additional advantage of the invention is that it can be used with other regions of the skin surface other than fingertips for user identification, such as a knuckle or an elbow. This would be useful, for example, in special cases where users either do not have or do not have use of their fingers.

In summary, the invention is an optical system for imaging the features, ridges, and height variations of an object by exploiting the properties of specular reflection of light to maximize the contrast of the features, ridges, and height variations. The invention comprises a light source (such as a light emitting diode), a means for positioning the object to be imaged (such as a physical rest or a position detector), a means for shaping the wave front of the light emitted from the light source so as to cause it to illuminate the object so as to produce a strong specular reflection over the entire surface of the object (such as mirror or lenses), a means for focusing an image of the object using the reflected light (such as lenses or mirrors), and an image sensor positioned so that the light reflected from the object creates the image on it (such as CCD or CMOS image sensors).

DESCRIPTION OF THE INVENTION

The invention produces high quality, high contrast, uniform, and consistent images of the surface features, such as characteristic ridges, of a finger or other biometric object. The basic physical property upon which the reader depends is the use of specular reflection of light to maximize the contrast of features, ridges, and height variations. Optionally, the invention uses a polarizer that filters and thereby enhances the specular reflection from the surface of the object. Optionally, the invention can also include pre-processing means for adjusting image brightness, contrast, and magnification.

In its presently preferred embodiment, the invention comprises (1) a light source that is a green light emitting diode or LED without a lens; (2) a spatial filter comprising a first stage with an aperture positioned against the light source for defining the effective size of the light source and a second stage with an aperture positioned concentric to the aperture of the first stage for defining the angle of the cone of light emitted from the light source; (3) a mirror that is concave and spherical and positioned in the light emitted from the spatial filter so as to capture the full cone of light; (4) an object rest positioned to hold the object to be imaged at about a 45° angle to the light reflected from the mirror, causing the specular component of the light reflected from the object to be partially linearly polarized, and to also hold the object just inside the source image point of the mirror so as to allow the object to be fully illuminated in the cone of light reflected from the mirror, and further positioned so that the source image point is collocated with the light source, and further located so as to be outside of the cone of light emitted from the spatial filter; (5) a polarization filter positioned in the light beam reflected from the object and oriented so as to pass only the s-component of the reflected light; (6) a lens positioned so that the light from the polarization filter passes through it; (7) a small aperture stop positioned so that the light from the lens passes through it for obtaining a large depth of field; and (8) an image sensor positioned so that the light from the aperture stop strikes it, and further positioned so that the image is focused on its surface by the lens, and also tilted at about a 30° angle to the axis of the light coming from the aperture stop for correcting the distortion of the image caused by the large angle of the object to the axis of the lens.

FIGS. 1 through 4 describe embodiments of the invention. FIG. 5 shows samples of the output from one embodiment of the invention.

Figure 1:
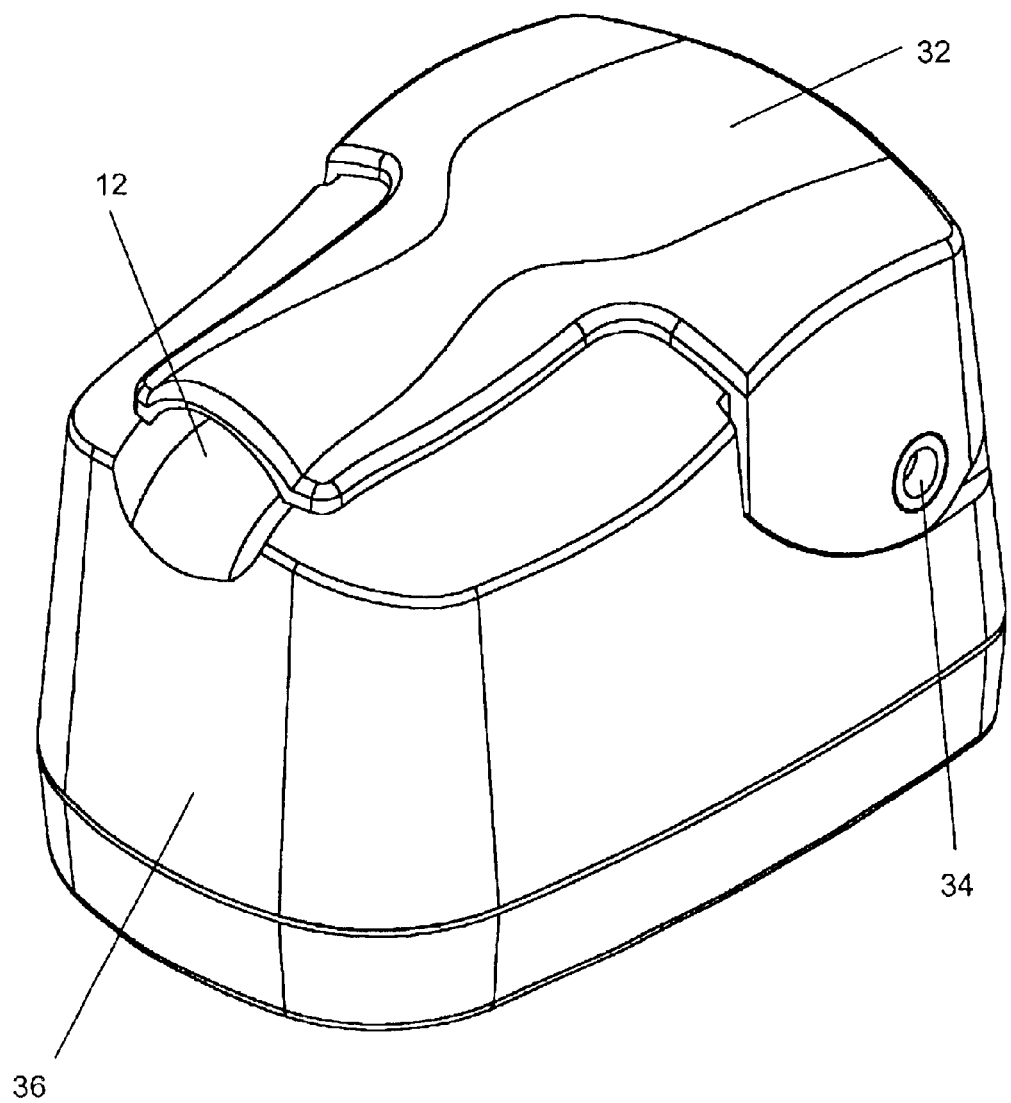
FIG. 1 is a perspective view of an embodiment of the invention designed for imaging fingerprints.

FIG. 1 is a perspective view of an embodiment of the invention designed as a fingerprint reader. The internal workings of the fingerprint reader are contained within a housing 36. In use, the user tilts back a lid 32 on a hinge 34 to expose the finger aperture plate 12, upon which a user's finger is placed to acquire an image.

Figure 2:
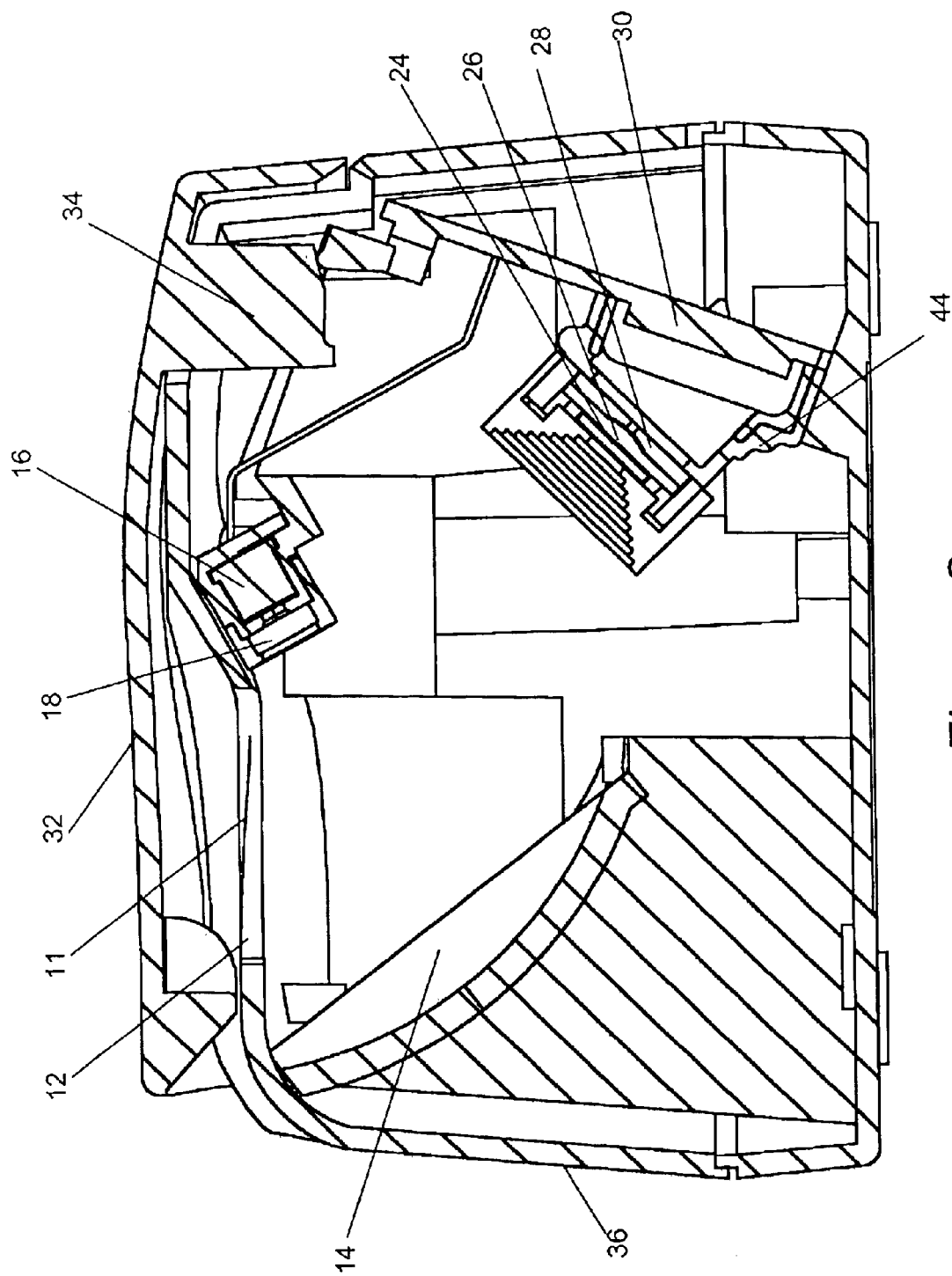
FIG. 2 is a box-schematic drawing of an embodiment of the invention designed for imaging fingerprints.

FIG. 2 is a cross-sectional view of the preferred embodiment depicted externally in FIG. 1, showing the internal workings of the imager. First, the internal workings of the embodiment are contained in a housing 36. A LED or other lamp 16 provides a light source that emits light, preferably of a green wavelength. The light is directed through a two-stage spatial filter 18 defines the angle of a cone of light emitted from the light source. (The spatial filter is so placed as to avoid direct light from the LED 16 shining on the object to be imaged at aperture 11.) The light is then directed onto a concave mirror 14 that is positioned to capture the full cone of light. From the concave mirror 14 the light is reflected through the finger aperture plate 12 to fully illuminate a fingertip placed over the opening or finger aperture 11 in finger aperture plate 12 so as to intercept and reflect the cone of light from the concave mirror 14. (The user lifts lid 32 by pivoting on hinge 34 to access the finger aperture 11.) The finger aperture plate 12 is positioned to hold the finger at about a 45 degree angle that is close to Brewster's angle, causing the specular component of the light to be partially linearly polarized.

After reflection from the fingertip, the light then travels through polarizer 24, which passes on the s-component of the light. The light then passes through imaging lens 26 and aperture stop 28. Image sensor 30 is positioned so that the light from the aperture stop 28 strikes it and is further positioned so that the image is focused on its surface by the imaging lens 26 and also tilted at about a 30° angle to the axis of the light coming from the aperture stop 28 for correcting the distortion of the image caused by the large angle of the finger to the axis of the imaging lens 26.

Figure 3:
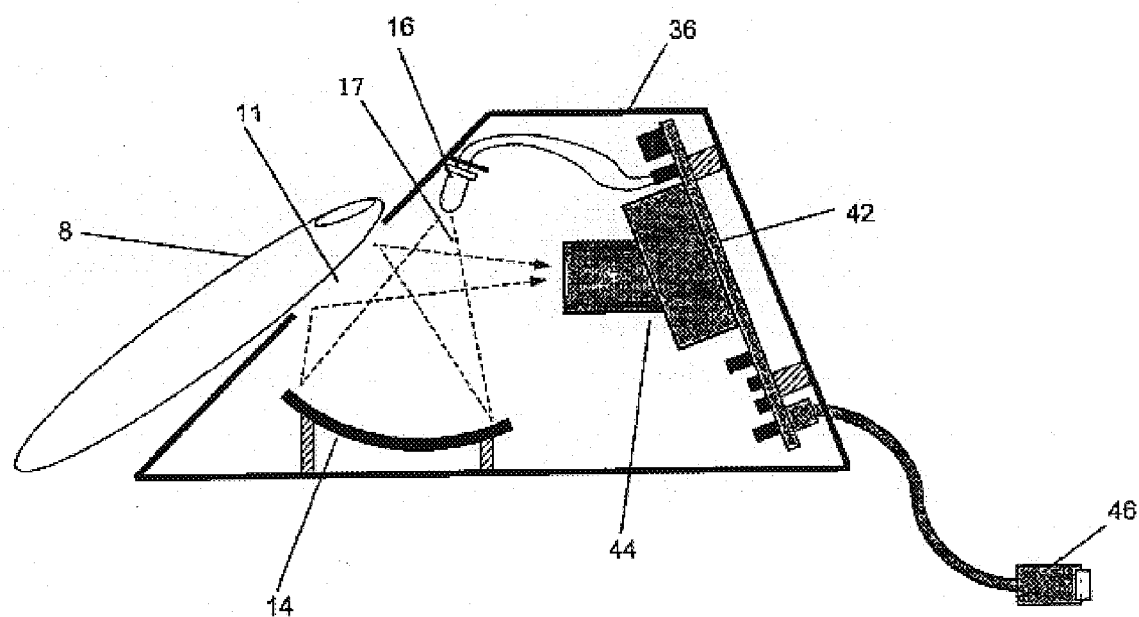
FIG. 3 is a cross-section view of an embodiment of the invention designed for imaging fingerprints.

FIG. 3 is a simplified conceptual schematic box diagram of an embodiment of the invention showing the light path from a light source 16 to a mirror 14 and then through a finger aperture 11. The light then strikes finger 8 and reflects into a camera assembly 44, which is mounted on a pre-processing circuit board 42, which is then connected externally through connector 46 to provide output for further processing or use.

Figure 4:
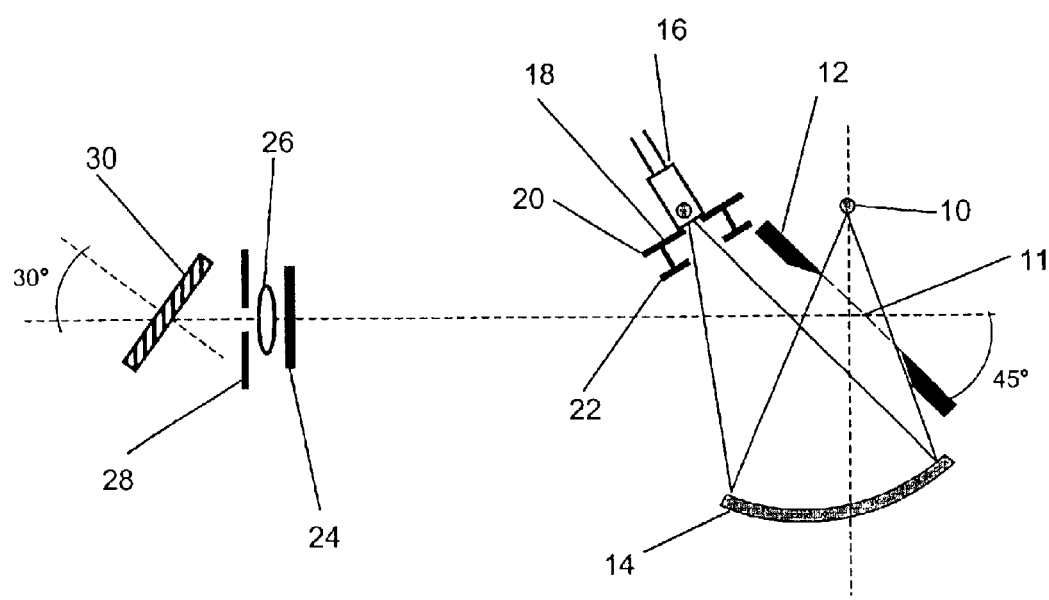
FIG. 4 is a schematic drawing of an embodiment of the invention designed for imaging fingerprints.
Figure 5:
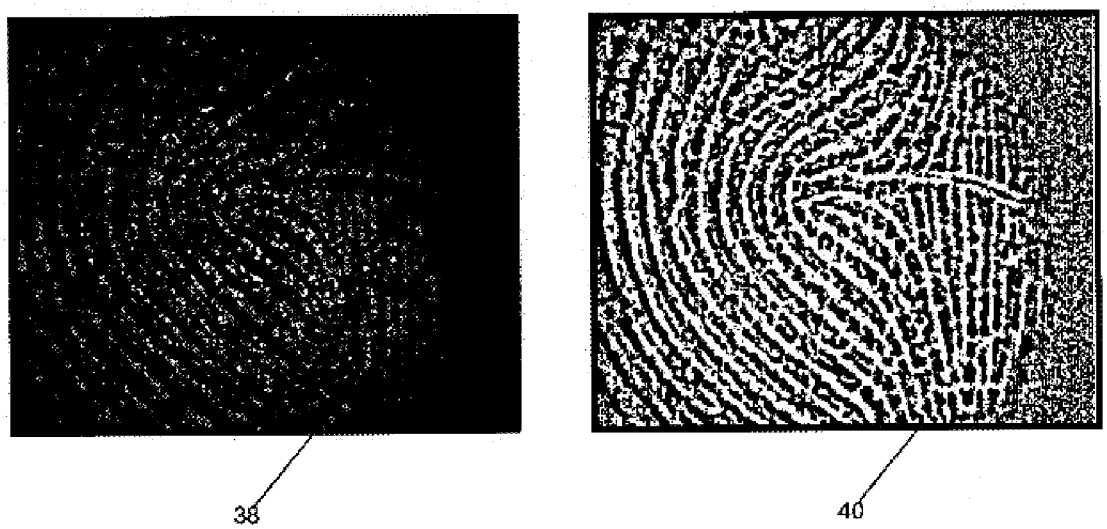
FIG. 5 shows examplar fingerprint images taken by the invention.

FIG. 4 is a conceptual schematic representation of the preferred embodiment of the present invention. LED or other light source 16 provides light, preferably of a green wavelength. The light is directed through a two-stage spatial filter 18. The two-stage spatial filter 18 consists of a first aperture 20 that is positioned against the light source so as to define the effective size of the light source and a second aperture 22 that is positioned concentric to the aperture of the first stage. The first aperture 20 and the second aperture 22 together define the angle of a cone of light emitted from the light source. The light is then directed onto a concave mirror 14 that is positioned to capture the full cone of light. From the concave mirror 14 the light is reflected through an opening or finger aperture 11 in a finger aperture plate 12 to focus on a source image point 10. The fingertip being imaged is placed over the opening 11 in finger aperture plate 12 to intercept and reflect the cone of light from the concave mirror 14. The finger aperture plate 12 is positioned to hold the subject finger at about a 45 degree angle that is close to Brewster's angle, causing the specular component of the light to be partially linearly polarized. The source image point 10 is collocated with the LED 16.

After reflection from the fingertip, the light then travels through polarizer 24, which passes on the s-component of the light. The light then passes through imaging lens 26 and aperture stop 28. Image sensor 30 is positioned so that the light from the aperture stop 28 strikes it and is further positioned so that the image is focused on its surface by the imaging lens 26 and also tilted at about a 30° angle to the axis of the light coming from the aperture stop 28 for correcting the distortion of the image caused by the large angle of the finger to the axis of the imaging lens 26.

FIG. 5 depicts results from an embodiment of the invention. Finger photograph 38 is an image captured by the image sensor. Finger graphic 40 is the finger image after pre-processing.

In its preferred embodiment, the invention uses special green LED's for illumination, providing high brightness and a short wavelength for low penetration below finger surface. The lens is polished off to produce a point-like source. In other embodiments, other light sources of other wavelengths can be used equivalently.

Shaped illumination is used to enhance the specular component of reflected light, reduce unwanted scattered light, maximize the amount of LED output delivered onto the finger surface, and ensure that the full surface of the object is illuminated. In the preferred embodiment, a concave mirror is used to collect and shape the light form the LED. As discussed in more detail below, in other embodiments other devices other than a concave mirror can also be used to collect and shape the light.

The preferred embodiment uses a polarizing filter directly in front of the camera (imaging) lens to further enhance the contrast of the surface features. The polarizer orientation is set to pass the s-component of the reflected light, which is naturally polarized upon specular reflection from a surface. The angle of the illumination is roughly set close to Brewster's angle to best exploit this effect. As discussed in more detail below, in other embodiments other devices other than a polarization filter can be used to enhance the specular component of the reflection.

In the preferred embodiment, illumination is delivered at a large angle to the surface to enhance the specular reflection effects of "shadowing" of grooves and polarization upon reflection. The view angle of the camera to the finger surface is large as well.

The large view angle of the camera creates both depth-of-field problems and image distortions. Two primary design features are used in the preferred embodiment to deal with these problems. First, a low aperture imaging optic provides high depth-of-field. Second, the image sensor is tilted to correct some of the image distortion. In other words, the camera lens mount is tilted with respect to the camera chip. For example, in one embodiment, the optic axis of the imaging lens is set at a 30 degree angle to the normal of the camera (sensor) plane.

Finally, in the preferred embodiment, a specially designed numerical preprocessor algorithm processes the image. This is the final mechanism by which images of the finger surface are given enhanced contrast, uniformity, and consistency. These are achieved by "flattening" and non-linear processing "binarizing" the raw images acquired by the camera via software algorithms.

The algorithms can be implemented in firmware on an embedded or dedicated processor or purely in software on the host computer (local or remote). There are two main functions of the numerical processor. The first function is the "flattening" of the image. The flattening process is needed to make the brightness and contrast constant within each image. This is required because the raw images have regions that are brighter than others (usually the center is brighter than the edges), and the contrast between the ridges and valleys of the finger surface also varies within a single raw image. In addition, raw images of one person's finger will vary in both their overall contrast and brightness, as well as in their local variations in contrast and brightness due to differences in finger placement, finger condition, LED brightness, and other illuminator anomalies from one reader to another The flattening process removes all of these variations. The flattening process is very important in optimizing the performance versus price ratio of the invention because it corrects for anomalies in the raw data allowing the use of low cost optical components that cause some of the inconsistencies.

The second function of the numerical processor is non-linear processing. The non-linear processing both enhances and normalizes (makes constant and uniform in value) the contrast of the images. One form of non-linear processing that is good for fingerprinting is "binarization". Binarization is essentially a thresholding operation that examines each point in the image and replaces its current value with one of two new values, such that the resulting image is binary (that is, it consists entirely of points having one of only two values such as +1 and −1). Other types of non-linear processing that produce continuous images (non-binary) can also be used, such as mappings from the raw image brightness values to some power of the brightness or to arctangent of the brightness. In all cases, the technique examines each point in the raw image and its surrounding neighborhood of points in order to decide how to choose the new value for that point. This is because raw images are non-uniform in both brightness and contrast.

The preferred embodiment of the invention includes an ergonomically shaped housing with a specially shaped opening sized to accept the pad of an average finger; a gravity driven lid that covers the opening, keeping dirt and other foreign objects from entering the housing and spoiling the function of the reader; a modified high brightness LED with no lens so as to function as a point-like light source; a concave mirror to collect and shape the light from the LED and direct it onto the surface of the finger; a chip based digital image sensor with a unique angled lens mount; a low cost, small aperture lens that forms the image of the finger on the sensor chip; and a linear polarizing filter directly in front of the lens to filter out multiply scattered and non-specular reflected light from the surface of the finger.

The preferred embodiment of the invention is designed to acquire high quality fingerprints without the use of a platen—no contact between the user's finger and the active reader sensor surface is required. This avoids problems with pressure sensitivity (variability in the print pattern due to finger pressure on the platen), latent prints smudges or loss of contrast due to oil and dirt residues left on the platen, electrostatic discharge problems of any kind (typical with the direct reading semiconductor chip sensors). It also reduces problems and variations in print quality due to finger dryness or moistness. In addition, because of the non-contact operation of the invention, specialized versions of the device can be produced for use in a sterile environment, requiring no contact whatsoever in order to take a fingerprint, and models that can get a biometric identification using body surfaces other than fingertips (such as knuckles, elbows, and toes). This may be of value in situations where users may be amputees, have no significant fingertip surface features or may for some other reason not have use of their hands (such as paraplegics or quadriplegics).

The above description of the overall preferred embodiment of the invention contains necessary compromises due to trade-offs made to reduce the cost of the embodiment and to reduce the device's overall size. More expensive individual elements can be substituted in places to possibly achieve better results. This is particularly true of the optics elements. Whereas the preferred embodiment uses a spherical mirror, molded mirrors of other shapes, such as elliptical or parabolic mirrors can be used, allowing other physical arrangements of the relative positions of the light source, the mirror, and the object. Similarly, more expensive, higher-quality lenses can be used, including aspheric lenses, possibly providing better imaging results, but at greater cost.

Many of the elements of the invention as described in the preferred embodiment have equivalent means that can be readily substituted for those individual elements. The elements with equivalent means include at least the shaping, positioning, polarizing, and preprocessing elements.

Equivalent means for shaping the illumination (or wave front of the light) include, but are not limited to, the use of a single concave mirror (as in the preferred embodiment); a series of mirrors; refraction through a lens or series of lenses; refraction through a shaped prism or series of prisms; transmission through a transmission mode holographic optical element; reflection from a reflection mode holographic optical element; passing through a single optical fiber or an array of optical fibers, the output end of each fiber positioned so as to contribute a portion of the desired illumination; passing through an optical fiber face plate (which is an array of optical fibers bundled or fused together as a single optical element, but with each fiber functioning independently as a light conduit), whose shape is tailored to produce the desired illumination; an array of light sources, each of which is positioned to produce the desired illumination; or combinations of the foregoing, such as combinations of reflective surfaces, lenses, prisms, holographic optical elements, or arrays of optical fibers, all positioned or shaped to produce the desired illuminating wave front.

Equivalent means for positioning the object to be imaged include, but are not limited to, using a rest against which the object is placed, the rest shaped so as to define the orientation of the object in space with respect to the imaging system (as in the preferred embodiment); an optical detector or set of detectors whose light is either blocked by or reflected from the object, thereby producing a signal that is used to trigger the image acquisition when the object is in the proper position and orientation; an optical detector that provides user feedback on positioning, such as an audio, visual, or tactile feedback, thereby guiding the placement of the object; capacitive sensor or sensors; acoustic or ultrasonic sensor or sensors; air flow or pressure sensor or sensors; an object holder which in turn self-locates by mechanical or other means onto the imaging device; a mechanical arm or actuator that grasps and places the object into position for imaging; a primary image sensor (camera) that detects the location and orientation of the object by acquiring and analyzing images by means of an algorithm, or by monitoring the automatic gain control signal, or any other signal produced by the image sensor; or a second image sensor or set of image sensors used in conjunction with the primary image sensor.

Equivalent means for polarizing include, but are not limited to, linear polarizing filters, such as dichroic sheet polarizers; retardation plates, such as wave plates, typically either one-quarter or one-half wave plates, but can be of any retardation needed; polarizing beam splitters; polarizing mirrors; rotation plates, which are made of optically active material that rotates the polarization state of input light as it travels through the plate; birefringent crystals and crystal optics made from birefringent materials, such as Glan-Thompson, Glan-Taylor, or Wollaston prisms; or any combination of the above equivalent means.

Equivalent means for processing the image to flatten it by normalizing the image brightness include, but are not limited to, filtering each image for low spatial frequencies and normalizing the brightness variation of the original image based on the filtered image; convolving the image with a two-dimensional kernel and thresholding each pixel of the image based on the value of the convolution at each point; or measuring and storing a two-dimensional array (image) of the variation in the illumination over the field of view of the image and using this to normalize each image.

Equivalent means for non-linear processing of the image to enhance and normalize the contrast of the image include, but are not limited to, convolving the image with a two-dimensional kernel and thresholding each pixel of the image based on the value of the convolution at each point; convolving the image with a two-dimensional kernel and applying a non-linear gain function (multiplicative factor) to each pixel of the image based on the value of the convolution at each point; applying a non-linear gain function to the whole image once the brightness has been normalized; or applying a moving window technique over the image and adjusting the value of the center pixel in the window based on the histogram of the pixels within the window.

Equivalent means for normalizing the magnification of the image include, but are not limited to, applying a surface mapping technique; applying a morphing technique; or measuring and storing the magnification as a function of position in the image and remapping the pixels to new positions with the use of interpolation.

The preferred embodiment is operated as follows: When a user places a finger over the opening in the invention housing, the image capture is triggered. The LED is turned on to full brightness, then after a short preprogrammed delay a single image is captured by the camera. This "raw" image is then either sent to the host computer for preprocessing, or preprocessed in the reader itself using an on-board processor (such as a digital signal processing (DSP) chip) that has the processing algorithm stored in its locally available memory. The preprocessed image can then again be sent to the host computer for further processing to do the identification of the user (generate the template or a user identification number), or this step can also be done using an on-board processor in the invention itself. In all cases, information can be encrypted before sending it from the invention to the host machine if security considerations warrant it. Once the template or unique user identification number is generated, access or transaction control is handled by a database program running on either a local or remote host computer.

The illuminator system of the preferred embodiment consists of a high brightness green LED (commercially available) with a flat optical facet, i.e., no lens, or with its plastic lens removed; a two stage spatial filter (two concentric apertures separated by a specified distance) to control the illuminating beam emitted from the LED; and a concave mirror that collects, reshapes and redirects the LED light onto the finger surface. The LED has no lens, or has the lens removed, for example by polishing, in order to make it behave as much like a point source of light as possible, and to get rid of inconsistencies in the beam pattern produced due to variations in the exact shape of the lenses, which are inexpensively mass produced.

Light from the LED passes through the two stage spatial filter and fills the aperture of the concave mirror. The mirror shapes the light beam by focusing it at a point, which is determined by the curvature of the mirror, and which is designed to be a small distance beyond the surface of the fingertip to be imaged. This means that the light illuminating the finger is converging, forming a cone-like beam. The geometry is arranged so that the surface of the. fingertip intercepts this cone of light before its vertex or focus so that the entire pad of the finger exposed in the aperture of the invention is illuminated.

Both the rate of convergence and the angle of incidence of the converging beam onto the finger are optimized to produce the most specular reflected component over the entire field of view (the exposed fingertip), thereby producing a high degree of contrast between reflection from the ridges versus valleys of the finger surface. The convergence rate of the light is controlled by the radius of curvature of the mirror and the distance between the LED and the mirror. The incident angle of illumination is set by the angles of the LED and mirror with respect to each other and the finger itself.

The two-stage spatial filter controls the size of the cone of light emanating from the LED. This is critical in maximizing contrast in the finger image because it stops all light other than that needed to fill the mirror and illuminate the finger. Any other light would cause problems by being scattered inside the reader and eventually being reflected from the surface of the finger at angles that could reduce the desired contrast or would go directly into the camera, creating an unwanted background signal. The position and angle of the LED, and the size of the spatial filters, also must be set so that no light from the LED is projected directly onto the finger because this also causes a loss of contrast in the region of the finger struck by the direct illumination.

The two-stage spatial filter consists of one small aperture whose diameter is slightly larger than the LED source size, and a second larger, concentric aperture positioned a small distance from the first. The first aperture rests on the facet of the LED and serves to define the effective source size. The second aperture then defines the emitted cone angle. The diameter of the second aperture and its distance from the first one are coupled parameters that define the desired cone angle.

In the current preferred embodiment of the invention, the LED is placed inside the invention housing adjacent to the position of the fingertip, and the focal point of the light reflected from the concave mirror (which is also the point in space at which an image of the LED source is formed) is positioned very close to the fingertip, just beyond the surface of the finger. This geometry not only produces a nearly optimal illumination pattern for good contrast, but it is also arranged such that the source and its image are collocated in space. This also means that a spherical mirror is almost optimal, which in turn reduces the cost of manufacturing the mirrors, since the spherical shape is easy to design, specify, and produce.

Other embodiments of the invention can, however, have the LED and mirror locations moved, for example, to reduce the size of the device or to change its shape. This can be accomplished by adjusting the shape of the reflector to an elliptical or even more complex shape in order to achieve the right illumination for maximum contrast.

In the preferred embodiment, the finger aperture is tilted at a +45° angle to the optic axis of the camera lens. The axis of the illuminating cone of light is set at approximately a +45° angle to the normal of the plane of the finger aperture, (90° to the optic axis of the camera lens). This geometry enhances the contrast producing effects of specular reflection. Because of the high angles of incidence and reflection, the specular component of the light becomes polarized. This fact is exploited in the preferred embodiment of the invention by placing a polarizing filter over the camera lens which passes only the s-component of the reflected light, and thereby further enhances the contrast of the finger surface features.

Because the object to be imaged is placed at a large angle to the optical axes of the imaging lens of the camera, normally, both depth of field and image distortion problems can occur. In order to correct these problems simply and cheaply, the plane of the camera sensor chip is tilted with respect to the axis of the imaging lens by about 30°. In addition, the lens mount for the camera incorporates a small aperture to "stop down" the lens. These two features increase the depth of field and compensate for distortions, thus allowing the use of only a single low-cost plastic lens. The low light collection caused by the small aperture is compensated for by the use of the high brightness LED. This trade-off is made again to optimize performance versus price, since the cost of a bright LED source is much lower than that of a specially corrected optic. However, additional embodiments can employ specially molded aspheric or asymmetric imaging lenses to further improve overall performance when the greater cost is not an important factor.

Although the present invention has been described in considerable detail with respect to certain preferred versions, other versions are possible. Therefore, the spirit and scope of the appended claims should not be limited to just the description of the preferred versions. In addition, one skilled in the art will recognize that equivalent structures can be used for parts in the preferred embodiments without changing the spirit of the invention. Therefore, again, the following claims should be read to include those equivalent structures.

What is claimed is:

1. An optical system for imaging the features, ridges, and height variations of an object by exploiting the properties of specular reflection of light to maximize the contrast of the features, ridges, and height variations, the system comprising:
    a) a light source;
    b) a means for positioning the object to be imaged;
    c) a means for shaping the wave front of the light emitted from the light source so as to cause it to illuminate the object so as to produce a strong specular reflection;
    d) a means for focusing an image of the object using the reflected light;
    e) a first stage of a spatial filter with an aperture positioned against the light source for defining the effective size of the light source;
    f) a second stage of the spatial filter with an aperture positioned concentric to the aperture of the first stage for defining the angle of the cone of light emitted from the light source; and
    g) an image sensor positioned so that the light reflected from the object creates the image on it.

2. An optical system for imaging the features, ridges, and height variations of an object by exploiting the properties of specular reflection of light to maximize the contrast of the features, ridges, and height variations, the system comprising:
    a) a light source;
    b) a means for verifying the position of the object to be imaged;
    c) a means for shaping the wave front of the light emitted from the light source so as to cause it to illuminate the object so as to produce a strong specular reflection;
    d) a means for focusing an image of the object using the reflected light;
    e) a first stage of a spatial filter with an aperture positioned against the light source for defining the effective size of the light source;
    f) a second stage of the spatial filter with an aperture positioned concentric to the aperture of the first stage for defining the angle of the cone of light emitted from the light source; and
    g) an image sensor positioned so that the light reflected from the object creates the image on it.

3. An optical system for imaging the features, ridges, and height variations of an object by exploiting the properties of specular reflection of light to maximize the contrast of the features, ridges, and height variations, the system comprising:
   a) a light source that emits a shaped wave front of light so as to cause it to illuminate the object so as to produce a strong specular reflection;
   b) a means for positioning the object to be imaged;
   c) a means for focusing an image of the object using the reflected light;
   d) a first stage of a spatial filter with an aperture positioned against the light source for defining the effective size of the light source;
   e) a second stage of the spatial filter with an aperture positioned concentric to the aperture of the first stage for defining the angle of the cone of light emitted from the light source; and
   f) an image sensor positioned so that the light reflected from the object creates the image on it.

4. An optical system for imaging the features, ridges, and height variations of an object by exploiting the properties of specular reflection of light to maximize the contrast of the features, ridges, and height variations, the system comprising:
   a) a light source that emits a shaped wave front of light so as to cause it to illuminate the object so as to produce a strong specular reflection;
   b) a means for verifying the position of the object to be imaged;
   c) a means for focusing an image of the object using the reflected light;
   d) a first stage of a spatial filter with an aperture positioned against the light source for defining the effective size of the light source:
   e) a second stage of the spatial filter with an aperture positioned concentric to the aperture of the first stage for defining the angle of the cone of light emitted from the light source; and
   f) an image sensor positioned so that the light reflected from the object creates the image on it.

5. The optical system of claim 1 or 2, wherein the means for shaping the wave front of the illuminating light is a concave mirror.

6. The optical system of claim 5, wherein the concave mirror is spherical.

7. The optical system of claim 1 or 2, wherein the means for shaping the wave front of the illuminating light is a lens.

8. The optical system of claim 1 or 2, wherein the means for shaping the wave front of the illuminating light is a holographic optical element (HOE).

9. The optical system of claim 3 or 4, wherein the light source further comprises an array of individual light emitters arranged to shape the wave front illuminating the object.

10. The optical system of claim 1 or 3, wherein the means for positioning the object is a rest.

11. The optical system of claim 2 or 4, wherein the means for verifying the position of the object is a photoelectric detector.

12. The optical system of claim 1 or 3, further comprising:
   a. means for positioning the object so that the light illuminating the object hits it at an angle sufficient to partially linearly polarize the specular component of the reflected light and
   b. a polarization filter positioned in the light beam reflected from the object and oriented so as to pass only the s-component of the polarized light to the image sensor.

13. The optical system of claim 2 or 4, further comprising:
   a. means for verifying that the position of the object is such that the light illuminating the object hits it at an angle sufficient to partially linearly polarize the specular component of the reflected light and
   b. a polarization filter positioned in the light beam reflected from the object and oriented so as to pass only the s-component of the polarized light to the image sensor.

14. The optical system of claim 1, 2, 3, or 4, further comprising a first polarization filter placed between the light source and the object.

15. The optical system of claim 14, further comprising a second polarization filter placed between the object and the image sensor positioned so that the light reflected off of the object passes through it and then to the image sensor and the second polarization filter, which is chosen and oriented to maximize the passing of the specular component of the reflected light.

16. The optical system of claim 15, wherein the polarization filters are each comprised of polarizers only.

17. The optical system of claim 15, wherein the polarization filters are each comprised of wave plates only.

18. The optical system of claim 15, wherein the polarization filters are each comprised of a polarizer and a Wave plate combined.

19. The optical system of claim 15, wherein the second polarization filter is a linear filter.

20. The optical system of claim 14, wherein the first polarization filter is a linear filter.

21. The optical system of claim 1, 2, 3, or 4, wherein the means for focusing the image is a lens positioned between the object and the image sensor to focus the light onto the image sensor.

22. The optical system of claim 1, 2, 3, or 4, wherein the light source is a light emitting diode or LED.

23. The optical system of claim 22, wherein the light emitting diode or LED does not have lens.

24. The optical system of claim 1, 2, 3, or 4, wherein the shaping means is a mirror that is positioned in the light emitted from the light source through the spatial filter so as to capture the full cone of light.

25. The optical system of claim 1 or 3, wherein the object is positioned so that the incident light is reflected from the object at an angle.

26. The optical system of claim 25, wherein the object is positioned so that the incident light is reflected from the object at an angle that is close to Brewster's angle, thereby causing the specular component of the light to be partially polarized.

27. The optical system of claim 1 or 3, wherein:
   a. the means for shaping the wave front of the illuminating light is a concave mirror: and
   b. the object is positioned so that the light from the mirror is reflected from the object at about a 45° angle.

28. The optical system of claim 1 or 3 wherein:
   a. the means for shaping the wave front of the illuminating light is a concave mirror; and
   b. the object is positioned so as to fully illuminated the surface of the object being imaged in the cone of light reflected from the mirror.

29. The optical system of claim 28, wherein the optical geometry is such that the concave mirror forms an image of the light source and that image is located side by side the light source itself.

30. The optical system of claim 29, wherein mirror is spherical.

31. The optical system of claim 1, 2, 3, or 4, wherein the mans for focusing the image is a lens positioned between the object and the image sensor for focusing the image onto the image sensor.

32. The optical system of claim 31, further comprising a small aperture stop positioned so that the light from the lens passes through it for obtaining a large depth of field.

33. The optical system of claim 25, wherein the image sensor is tilted at an angle relative to the axis between the object and the image sensor so as to correct for the distortion of the image caused by the angle of the object to the same axis.

34. The optical system of claim 27, wherein the image sensor is tilted at an angle of about 30°.

35. The optical system of claim 1, 2, 3, or 4, further comprising a means for processing the image to flatten it by normalizing the image brightness.

36. The optical system of claim 1, 2, 3, or 4, further comprising a means for non-linear processing of the image to enhance and normalize the contrast of the image.

37. The optical system of claim 1, 2, 3, or 4, further comprising a means for normalizing the magnification of the image.

38. The optical system of claim 1, 2, 3, or 4, further comprising a polarization filter placed between the object and the image sensor positioned so that the light reflected off of the object passes through it and then to the image sensor and the polarization filter, which is chosen and oriented to maximize the passing of the specular component of the reflected light.

39. The optical system of claim 38, further comprising a second polarization filter placed between the light source and the object.

40. The optical system of claim 2 or 4, wherein the object's position is verified so that the incident light is reflected from the object at an angle.

41. The optical system of claim 40, wherein the object's position is verified so that the incident light is reflected from the object at an angle that is close to Brewster's angle, thereby causing the specular component of the light to be partially polarized.

42. The optical system of 2 or 4 wherein:
 a. the means for shaping the wave front of the illuminating light is a concave mirror; and
 b. the object's position is verified so that the light, from the mirror is reflected from the object at about a 45° angle.

43. The optical system of claim 2 or 4 wherein,
 a. the means for shaping the wave front of the illuminating light is a concave mirror; and
 b. the object's position is verified so as to fully illuminate the surface of the object being imaged in the cone of light reflected from the mirror.

44. The optical system of claim 2 or 4, wherein:
 a. the means for shaping the wave front of the illuminating light is a concave mirror; and
 b. the object is position is verified so that the light from the mirror is reflected from the object at about a 45° angle.

45. The optical system of claim 2 or 4 wherein:
 c. the means for shaping the wave front of the illuminating light is a concave mirror; and
 d. the object's position is verified so as to fully illuminated the surface of the object being imaged in the cone of light reflected from the minor.

46. The optical system of claim 45, wherein the optical geometry is such that the concave mirror forms an image of the light source and that image is located side by side the light source itself.

47. The optical system of claim 29, wherein the image of the light source is located outside the cone of light emitted from the spatial filter.

48. The optical system of claim 1, 2, 3, or 4, wherein:
 e) the means for shaping the wave front of the illuminating light is a concave mirror; and
 f) the object is positioned so as to fully illuminated the surface of the object being imaged in the cone of light reflected from the mirror.

* * * * *